Sept. 6, 1966 R. L. BALLMAN ETAL 3,270,553
RHEOMETER
Filed July 13, 1964 2 Sheets-Sheet 1

RICHARD L. BALLMAN
ALBERT W. WOTRING
INVENTORS

BY Paul Sullivan
ATTORNEY

United States Patent Office 3,270,553
Patented Sept. 6, 1966

3,270,553
RHEOMETER
Richard L. Ballman, Granby, and Albert W. Wotring, Springfield, Mass., assignors to Monsanto Company, St. Louis, Mo., a corporation of Delaware
Filed July 13, 1964, Ser. No. 382,695
5 Claims. (Cl. 73—56)

The present invention relates generally to a new and useful rheometer and more specifically to a piston-barrel extrusion rheometer possessing unusual and desirable features.

Melt index rheometers of the piston-barrel type are used in the plastics industry to determine the viscosity of molten polymers. The viscosity of a polymer characterizes its behavior in process, such as in the molding or extruding operation. In addition, because of the direct correlation of molecular weight and viscosity, melt viscosity is a valuable means of assessing the variation of a polymeric material as it is manufactured. In conventional capillary extrusion rheometers, several problems arise due to the frictional forces developed between the plunger, used to force the molten polymer through a capillary, and the barrel. This is caused by material flowing back between the plunger and rheometer barrel. The error introduced by this frictional force is often significant and is difficult to take into account in the final melt viscosity calculation due to the variation in the magnitude of the frictional force with the viscosity of the material under study. Another error in the determination of melt viscosity is introduced by a small amount of polymer backflow between the plunger and the barrel, since this causes the real shear rate to be lower than that calculated from the plunger velocity.

It is therefore an object of this invention to provide a new and useful capillary extrusion rheometer which eliminates these sources of error and provides a truer and more accurate measurement of the melt viscosity of a material under study.

It is a further object of this invention to provide a plunger for use in an extrusion rheometer which eliminates errors due to plunger friction and backflow at nominal cost and without the necessity of complex modifications in presently existing equipment.

These and other objects of this invention will become more apparent from the following description when read in conjunction with the accompanying drawings.

Figure 1:
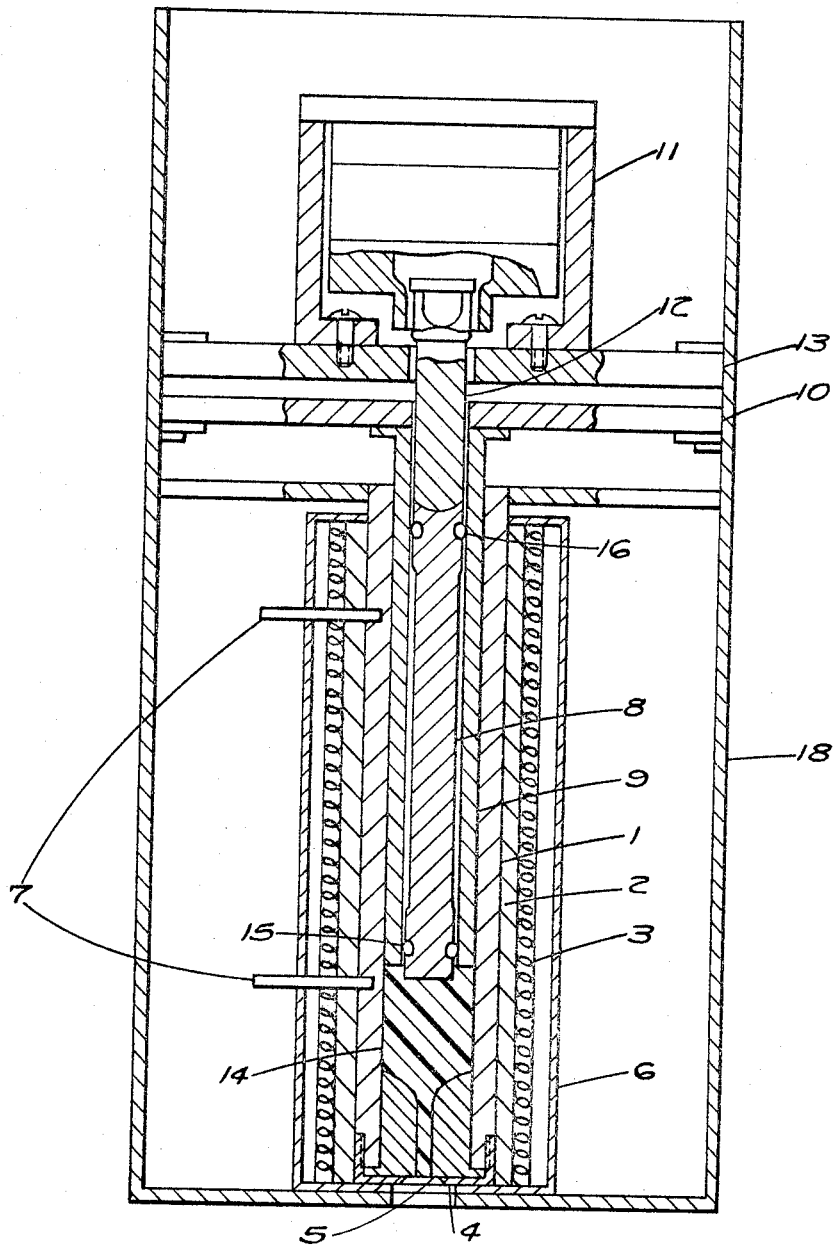
FIGURE 1 is a cross sectional view of a capillary extrusion rheometer constructed in accordance with this invention.

The above objects and other objects of this invention have been realized through the development of a novel capillary extrusion rheometer which introduces modifications to presently existing equipment which eliminate errors due to wall friction and the like. Referring now in more detail to FIGURE 1 of the drawings, there is illustrated a rheometer consisting of a cylindrical barrel 1 which may be constructed of any thermally conductive material capable of withstanding temperatures and pressures associated with this type of equipment. Typically, the barrel is constructed of stainless steel. Surrounding barrel 1 is a barrel jacket 2, to which is attached a circumferential heater 3. By the use of a barrel having a small inside diameter, samples may be heated up to temperature fast enough to minimize temperature degradation. Any type of heater and heating arrangement which is capable of uniformly heating the barrel to a desired temperature may be used in this regard and the particular manner of heating the barrel does not constitute a part of this invention. Heater 3 may, if desired, consist of a series of circumferentially spaced heaters in place of the unitary cylindrical type of heater illustrated. A clamping nut 4 is provided at the base of barrel 1 to hold capillary 5 in position within the extrusion barrel. This arrangement allows the use of interchangeable capillaries having various length to diameter ratios, thereby making it possible to minimize the effects of entrance, exit, and transient losses. Barrel 1, barrel jacket 2, and heating element 3, may be enveloped by a furnace shell 6. The barrel assembly may also be provided with thermocouples 7 positioned at any convenient location along the barrel, and the entire unit may be housed in machine columns such as those designated 18.

A plunger consisting of an inner member 8 and an outer member 9 concentric with inner member 8 is shown positioned within the barrel 1 and in alignment therewith. Members 8 and 9 may be made of any thermally conductive material capable of withstanding the pressures and temperatures developed in operating the rheometer. Typically, members 8 and 9 are constructed of stainless steel or the like. Outer member 9 is driven downwardly into contact with the sample of material to be evaluated by a cross head 10, which is in turn driven by any convenient drive means. The speed of the cross head is constant and independent of load. Inner member 8 is driven by a load cell 11, which engages member 8 through load cell extension 12. The force required to move inner member 8 at a designated speed is detected by the load cell and is plotted on a recording means such as a strip chart recorder or the like. Many types of commercially available compression load cells are useful in this regard and any load cell conventionally used in equipment of this type may be utilized in this invention. The principal requirements of these cells are that they be capable of measuring loads over a wide range and be sufficiently sensitive to measure small changes in compression. Load cell 11 is attached to a second cross head 13 which operates in unison with cross head 10. Again, any of the conventional types of drive mechanisms may be used to drive the cross head downwardly. Cross heads 10 and 13 may be driven mechanically or electromechanically, as well as either independently or from a common drive mechanism.

In operation, a sample of material 14 to be evaluated is placed in the extrusion chamber above capillary 5. The plunger is lowered into position, the sample is heated to temperature, then forced out through interchangeable capillary tube 5 by the plunger consisting of members 9 and 8 fastened to the cross head and load cell, respectively. Since the speed of the plunger is constant and independent of load, the volumetric rate of flow through the capillary is constant for any given plunger speed. Shear stress, melt viscosity, etc., can be readily calculated from the measured force and the length to diameter ratio of the capillary.

The concentric member arrangement of the plunger eliminates errors caused by frictional forces developed through contact of the polymer sample with the plunger and the inner wall of the barrel since the forces developed are not measured or recorded by the load cell. In addition, errors in flow rate caused by backflow of material between the barrel wall and outer member 9 can be minimized by decreasing the clearance between the barrel wall and member 9 without fear of introducing frictional error.

The head of the plunger in contact with the sample material may assume any of several forms. It may, for example, consist of two concentric members separated by a plastic sealing ring, such as Teflon "O-ring" 15. This sealing ring prevents polymer leakage between the surfaces of the concentric members. In addition, an "O-ring" 16 may be placed at the upper end of the plunger if desired to maintain proper alignment of the members.

Figure 2:
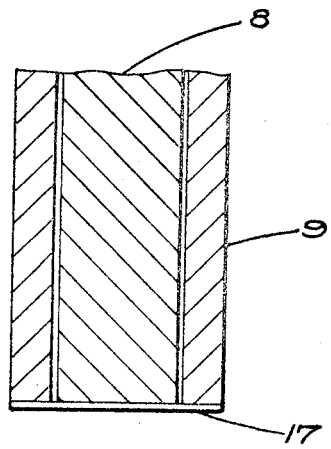
FIGURE 2 is a partial cross sectional view of one embodiment of a plunger useful in an extrusion rheometer.

FIGURE 2 illustrates an alternative configuration of the plunger head. A diaphragm 17 is stretched across the plunger head to prevent polymer leakage. The diaphragm may be constructed of any of several materials such as metals or plastics. In this embodiment, the frictional forces developed along outer member 9 and the wall of barrel 1 will not adversely affect the force being measured by the load cell.

Figure 3:
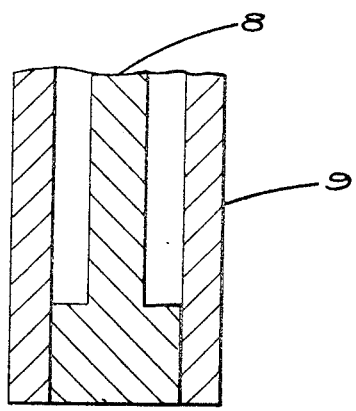
FIGURE 3 is a partial cross sectional view of another embodiment of a plunger useful in an extrusion rheometer.

The plunger head may also be constructed as shown in FIGURE 3. It is necessary, when employing this type of plunger head, that the clearance between the inner and outer member be sufficient to allow sliding movement between the members, yet prevent polymer leakage between the members.

It can be readily seen from the above description that the extrusion rheometer of this invention eliminates plunger-barrel friction effects since the relative motion or velocity between the inner and outer members is essentially zero. Many modifications of this two-component plunger system will occur to one skilled in the art other than those illustrated above, and such modifications are intended to be included within the spirit of this invention. The load cells, drive means, heating means, and other conventional rheometer components may be modified and substituted with other equivalent elements well known in the art without departing from the scope of this invention.

What is claimed is:

1. A capillary extrusion rheometer which comprises: a housing defining an extrusion chamber; a capillary die disposed in one end of said chamber restricting the outlet thereof; a plunger disposed to reciprocally move in said chamber consisting of: a first member having a surface adapted to slidably engage the walls of said chamber, and a second member concentrically disposed within said first member; means for driving said first and second members in unison relationship; and force measuring means engaging said second member.

2. A capillary extrusion rheometer which comprises: a barrel defining a cylindrical extrusion chamber; a capillary die disposed in one end of said chamber restricting the outlet thereof; a plunger disposed to reciprocally move in said chamber consisting of: a cylinder, the surface of which is adapted to slidably engage the walls of said chamber, and a rod concentrically disposed within said cylinder; means for moving said rod and cylinder in unison at a regulated speed; and means engaging said rod for measuring the force applied to move said plunger.

3. The rheometer of claim 2 which further comprises a sealing ring disposed between said rod and said cylinder to prevent leakage of material therethrough.

4. The rheometer of claim 2 further comprising a diaphragm abutting the ends of said rod and said cylinder.

5. The rheometer of claim 2, wherein at least the lower extremity of said rod is in sliding engagement with said cylinder.

References Cited by the Examiner

UNITED STATES PATENTS

| | | | |
|---|---|---|---|
| 413,453 | 10/1889 | Mitchell. | |
| 1,962,861 | 6/1934 | Ericson | 73—55 |
| 2,561,266 | 7/1951 | Dietert. | |
| 2,569,226 | 9/1951 | Carter. | |
| 2,570,284 | 10/1951 | Scott et al. | |
| 2,934,206 | 4/1960 | Scribner | 18—12 X |
| 2,964,177 | 12/1960 | Scribner | 18—12 X |
| 2,981,976 | 5/1961 | Mayer | 25—25 X |
| 3,158,263 | 11/1964 | Scribner | 18—12 X |

WILLIAM J. STEPHENSON, *Primary Examiner.*